United States Patent [19]
Malik

[11] 3,785,154
[45] Jan. 15, 1974

[54] HYDRODYNAMIC FLUID UNIT WITH ENERGY STORAGE

[75] Inventor: Marvin J. Malik, Bloomfield Hills, Mich.

[73] Assignee: General Motors Corporation, Detroit, Mich.

[22] Filed: Oct. 30, 1972

[21] Appl. No.: 302,198

[52] U.S. Cl. .................. 60/347, 60/364, 60/366
[51] Int. Cl. ................................ F16h 41/04
[58] Field of Search ............. 60/330, 341, 345, 60/347, 357, 364, 352, 366

[56] References Cited
UNITED STATES PATENTS
2,407,497  9/1946  Jandasek .................. 60/353
2,434,218  1/1948  Miller ...................... 60/353

Primary Examiner—Edgar W. Geoghegan
Attorney—W. E. Finken et al.

[57] ABSTRACT

This torque converter has an auxiliary rotor which is drivingly connected to an inertia mass that stores energy during normal converter operation. When increased output torque is desired, the blades of the stator are switched to a high angle position to change the direction of flow into the auxiliary rotor. Under these conditions the inertia mass drives the auxiliary rotor causing it to act as an auxiliary pump to increase flow rate in the converter so that torque on the turbine is increased.

4 Claims, 4 Drawing Figures

PATENTED JAN 15 1974 3,785,154
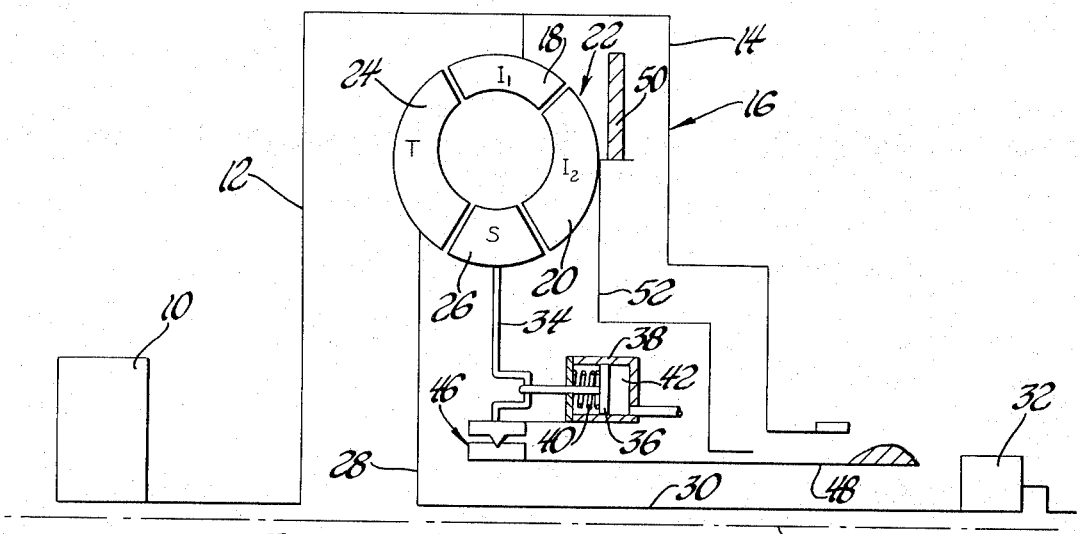
Fig. 1
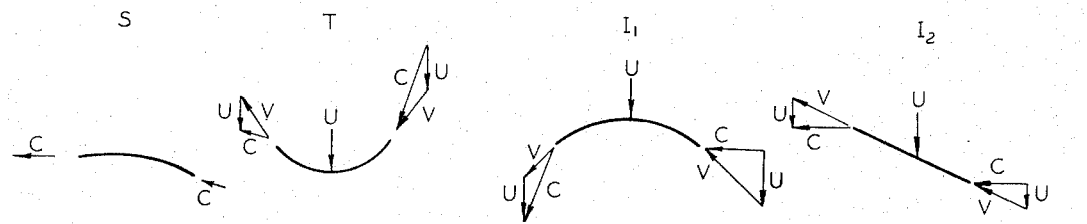
Fig. 2 (STEADY STATE)
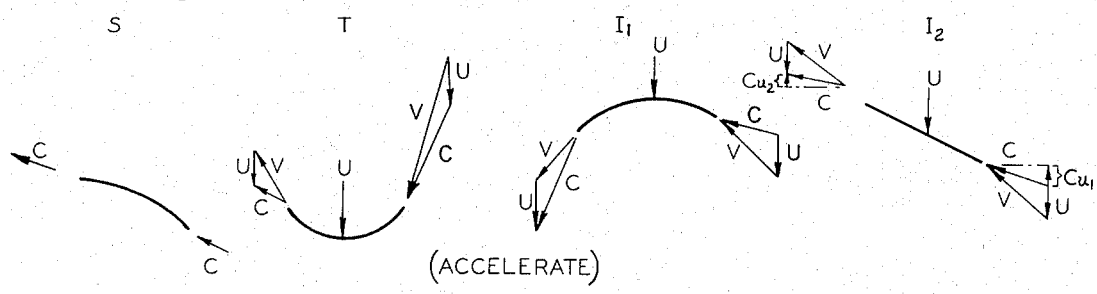
Fig. 3 (ACCELERATE)
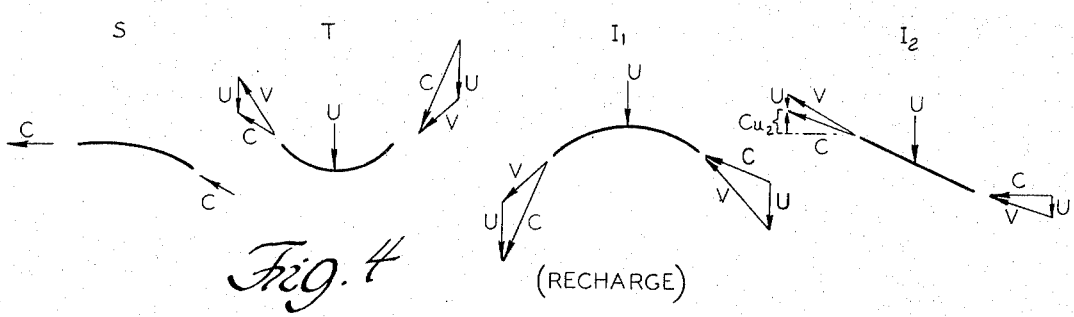
Fig. 4 (RECHARGE)

HYDRODYNAMIC FLUID UNIT WITH ENERGY STORAGE

This invention relates to hydrodynamic power transmitting units and more particularly to a torque converter having an inertia mass attached to one of the converter rotors for storing energy that can be selectively employed to increase input speed and output torque.

In the preferred embodiment of this invention a torque converter has a dual section impeller comprising a bladed primary pumping section which is directly driven by an engine and a separate bladed auxiliary section drivingly connected to an inertia mass. A bladed turbine is disposed adjacent to the primary section of the impeller which absorbs energy from the oil projected into it by the impeller and converts this energy into torque that is transmitted to an output shaft for drive of transmission gearing. Disposed between the pump and the auxiliary section of the impeller is a stator with variable pitch blades initially set at a low angle position relative to the centerline of the converter. The stator is supported on a ground sleeve by one-way brake assembly. When the flow from the turbine tends to rotate the stator counterclockwise, the one-way brake engages so that the stator blades redirect oil flow from the turbine into the impeller at an angle that assists impeller rotation to provide for torque multiplication. As the turbine approaches the speed of the primary section of the impeller, the direction of oil flow into the stator changes so that the stator free wheels on the one-way brake allowing the converter to function as a fluid coupling.

During these converter operations the auxiliary section of the impeller rotates and absorbs energy from the circulating fluid which is stored in a connected inertia mass. For increased performance additional torque may be obtained by changing the pitch of the stator blades from a low angle position to a high angle position relative to the centerline of the converter. The resulting change in the direction of fluid discharged from the stator into the auxiliary section of the impeller causes this impeller to pump oil using the energy stored in the inertia mass and impart a positive change in the tangential component of the fluid discharged therefrom. This results in a higher pump head which in turn increases the flow rate of fluid in the torus. With this increased flow rate the turbine output torque is increased for vehicle acceleration. When the desired output speed is obtained, the stator blades are moved to their low angle position which causes a negative change in the tangential component of the fluid. This results in the auxiliary rotor acting as a turbine and absorbing energy thereby increasing in speed and storing kinetic energy in the inertia mass.

It is an object, feature and advantage of this invention to provide a new and improved torque transmitting hydrodynamic unit that utilizes an auxiliary impeller having an inertia mass for storing energy during normal operation which is selectively discharged in a subsequent operation to increase fluid pumping action to increase output torque of the unit.

Another object, feature and advantage of this invention is to provide a new and improved hydrodynamic unit employing an inertia mass operatively connected to a rotor of the unit, separate from a primary impeller, that rotates and stores energy during normal operation of the unit and that subsequently drives the connected rotor to condition the hydrodynamic unit for increased output torque.

Another object, feature and advantage of this invention is to provide a new and improved torque converter in which an inertia mass is tied into one of two sections of a dual section impeller which stores energy during normal operation of the converter that is subsequently selectively employed to increase output torque while relieving the load on the engine driven impeller to provide for increased input speed.

These and other features, objects and advantages of this invention will become more apparent from the following detailed description and drawing in which:

FIG. 1 is a diagrammatic side sectional view of the upper half of a torque converter with a variable pitch stator and with energy storage means connected to one of the converter rotors;

FIGS. 2, 3 and 4 are diagrammatic views of blade geometry and vector diagrams illustrating operation of the converter of FIG. 1.

As shown in FIG. 1, there is an engine 10 drivingly connected to the annular front cover 12 of the rotatable housing 14 of hydrodynamic torque converter 16. The housing 14 is drivingly connected to a bladed primary impeller 18 which with a separate auxiliary rotor 20 forms a dual section impeller assembly 22. In addition to the separate rotors of the impeller assembly the converter has a bladed turbine 24 operatively disposed adjacent to the primary impeller, and further has a bladed stator 26 disposed between the turbine 24 and the auxiliary rotor 20. These bladed rotors are arranged in a torus to circulate transmission fluid supplied thereto through suitable controls, not shown. The primary impeller, the auxiliary rotor, the turbine and the stator are labeled I, $I_2$ T and S respectively for reference purposes in the diagrams of FIGS. 2 through 4.

The turbine 24 is operatively connected through a radial hub 28 to an output shaft 30 for transmitting torque to transmission change speed gearing 32. The blades of the stator are secured to separate cranks 34 that extend radially inwardly and are operatively connected to an annular, hydraulically-actuated piston 36 mounted for longitudinal movement in a housing 38 disposed around the rotational axis 39 of the converter, which is coaxial with the axis of the shaft 30. A spring 40 disposed in the housing 38 exerts a force on the piston to move it to one side of the housing to turn the cranks 34 and thereby turn the connected stator blades to their low angle position. A control pressure selectively fed through a passage from the transmission controls to a control chamber 42 formed by the piston in the housing 38 is employed to move the piston to the other side of the housing to turn cranks 34 and the stator blades to their high angle position. When the chamber 42 is exhausted the spring 40 will again turn the stator blades to their low angle position.

The stator 26 and the piston housing are secured to a one-way brake 46 which has an inner race fixed to a ground sleeve 48. The one-way brake engages to prevent rotation of the stator in a counterclockwise direction during the torque multiplying phase of converter operation and releases to allow rotation of the stator clockwise during the coupling phase of operation.

Disposed within the converter housing 14 is an annular inertia mass 50 secured to the auxiliary impeller 20. The inertia mass 50 and the bladed auxiliary impeller 20 are supported in the converter assembly by an annular plate 52 mounted for rotation on ground sleeve 48.

In the preferred operation of this invention the blades of stator 26 are initially set by action of spring 40 at a low angle position relative to the converter centerline 39. Assuming that the engine is operating and vehicle propulsion is desired, the engine throttle is opened to increase engine power and torque. The engine driven primary impeller 18 initially drives the oil fed to the converter so that converter stall is quickly obtained. The stator remains held by the one-way brake as stall torque is developed by the stationary turbine. The auxiliary impeller 20 rotatably driven by the circulating oil stores energy in the connected inertia mass while pumping fluid to the primary impeller 18.

Usually the vehicle is propelled when there is appreciably less than the maximum torque multiplication that is available through the converter. As the vehicle moves and gains speed and momentum, the demand for torque decreases so that the torque applied to the turbine progressively increases turbine speed.

If additional torque is needed to meet load requirements or for accelerating the vehicle, the variable pitch stator blades can be switched from the low angle position to the high angle position by filling chamber 42 with oil from the controls to stroke piston 36. With the stator at high angle the auxiliary rotor 20 or $I_2$ will be driven by the inertia mass. When driven, the auxiliary rotor acts as a pump and increases the flow in the converter to increase the torque on the turbine.

FIGS. 2, 3 and 4 illustrate the operation of this invention. In the various vector diagrams shown $U$ = element speed, $C$ = absolute velocity of the circulated oil, $V$ = velocity of the oil relative to the bladed element and $C_u$ = tangential component or whirl component of the absolute velocity. In FIG. 2 the converter is in steady state operation with the stator blades at their low angle position. In this condition the tangential component $C_u$ of the absolute velocity $C$ is zero at the entrance and exit of the auxiliary rotor $I_2$. Thus the auxiliary rotor $I_2$ is rotating in the fluid and is not increasing the fluid flow. When the stator blades are switched to their high angle position to effect acceleration of the vehicle, the absolute velocity $C$ at the entrance of the auxiliary impeller $I_2$ is changed and has a tangential component $C_{u1}$ which is greater than the tangential component $C_{u2}$ at the exit of the auxiliary rotor $I_2$. This positive change in the tangential component of the fluid indicates increased pump head and increased flow rate of fluid in the torus for increased turbine torque.

As energy is used from the inertia wheel it will progressively decelerate. To recharge the inertia wheel, the pressure is relieved from chamber 42 so that spring 40 strokes piston 36 to move the stator blades to their low angle position. The vector diagram at the entrance and exit of the auxiliary rotor $I_2$ show a negative change in tangential component of the absolute velocity from the auxiliary rotor with $C_{u1}$ being zero and $C_{u2}$ being negative. Under these conditions the auxiliary rotor accelerates and acts as a turbine to absorb energy which is stored in the inertia wheel.

While a particular embodiment of this invention has been shown and described for purposes of illustrating the invention, other embodiments will now become readily apparent to those skilled in the art. This invention is therefore not limited to the particular embodiment shown and described but by the following claims.

I claim:

1. A hydrodynamic torque transmitting unit comprising input and output members, input rotor means operatively connected to said input member for pumping and circulating fluid in said unit, output rotor means for absorbing torque from the fluid circulated in said unit, connector means operatively connecting said output rotor means to said output member, auxiliary rotor means rotatably mounted in said unit for pumping fluid in said unit, rotatable inertia mass means operatively connected to said auxiliary rotor means for storing energy from said circulating fluid and for subsequently driving said auxiliary rotor so that said auxiliary rotor pumps increased quantities of fluid to said input rotor means to increase the flow of fluid in said unit and thereby increase the amount of torque absorbed by said output rotor means.

2. A hydrodynamic torque converter rotatable about an axis comprising input and output members, bladed primary impeller means operatively connected to said input member for pumping and circulating fluid in said unit, bladed turbine means for absorbing energy from the fluid circulated in said unit to drive said output member, connector means operatively connecting said turbine means to said output member, stator means having a plurality of blades movable to a first or second fixed position with respect to the rotational axis of said torque converter, motor means for moving said stator blades to either of said positions, bladed auxiliary impeller means rotatably mounted in said unit adjacent to said primary impeller means, inertia mass means operatively connected to said auxiliary impeller means for rotating with said auxiliary impeller means and storing energy from said circulating fluid and for subsequently driving said auxiliary impeller means in reponse to movement of said stator blades from said first to said second fixed position so that said auxiliary impeller means increases the flow of fluid in said unit and thereby increases the amount of torque absorbed by said turbine means.

3. A hydrodynamic torque transmitting unit comprising rotatable input and output members, bladed input rotor means operatively connected to said input member for pumping and circulating fluid in said unit, bladed output rotor means for absorbing torque from the fluid circulated in said unit for driving said output member, connector means operatively connecting said output rotor means to said output member, stator means having a plurality of variable pitch blades operatively disposed in said unit, bladed auxiliary rotor means rotatably mounted in said unit and operatively disposed between said stator means and said input rotor means for pumping and circulating fluid exiting from said output rotor means into said input rotor means, inertia mass means operatively connected to said auxiliary rotor means, motor means for changing the pitch of the blades of said stator means to change the direction of fluid flow into said auxiliary rotor means so the energy stored in said inertia mass means is dissipated in driving said auxiliary rotor means to increase the flow rate in the unit and thereby increase the torque on said output rotor means.

4. A hydrodynamic torque converter comprising rotatable input and output members, bladed primary impeller means driven by said input member for pumping and circulating fluid in said converter, bladed turbine means for absorbing energy from the fluid circulated in said converter, connector means operatively connecting said turbine means to said output member so torque developed by said turbine means from said circulated fluid can be applied by said output member, stator means operatively disposed in said converter, auxiliary impeller means rotatably mounted in said unit and operatively disposed between said stator means and said primary impeller means, inertia mass means operatively connected to said auxiliary impeller means, said stator means comprising a plurality of fluid-directing blades, crank means operatively secured to said blades, and motor means operatively secured to said crank means for turning said stator blades to a first angular setting whereby said auxiliary impeller absorbs energy from said circulated fluid while driving said inertia mass means and subsequently for turning said blades to a second angular setting whereby the direction of fluid circulated to said auxiliary impeller is changed so that said auxiliary impeller is driven by said inertia mass means to effect an increase in the fluid pumping action of said auxiliary impeller means and the fluid flow rate in said converter to increase the torque on said turbine means.

* * * * *